(12) United States Patent
Wu et al.

(10) Patent No.: US 12,394,815 B1
(45) Date of Patent: Aug. 19, 2025

(54) GROUPING DEVICE, GROUPING METHOD, AND BATTERY PRODUCTION LINE

(71) Applicant: CONTEMPORARY AMPEREX TECHNOLOGY (HONG KONG) LIMITED, Hong Kong (CN)

(72) Inventors: Kai Wu, Ningde (CN); Weixu Yang, Ningde (CN); Yang Zhang, Ningde (CN); Leigang Qiu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 19/198,655

(22) Filed: May 5, 2025

Related U.S. Application Data

(63) Continuation of application No. PCT/CN2023/134751, filed on Nov. 28, 2023.

(30) Foreign Application Priority Data

Oct. 13, 2023 (CN) .......................... 202311322980.2

(51) Int. Cl.
*H01M 10/04* (2006.01)
(52) U.S. Cl.
CPC ... *H01M 10/0404* (2013.01); *H01M 10/0481* (2013.01)
(58) Field of Classification Search
CPC ...................... H01M 10/0404; H01M 10/0481
See application file for complete search history.

(56) References Cited

U.S. PATENT DOCUMENTS

2019/0363393 A1* 11/2019 Hashem ............ H01M 10/0486

FOREIGN PATENT DOCUMENTS

| CN | 101791874 A | 8/2010 |
| CN | 103837541 A | 6/2014 |
| CN | 212100868 U | 12/2020 |
| CN | 112792322 A | 5/2021 |

(Continued)

OTHER PUBLICATIONS

International Search Report in the international application No. PCT/CN2023/134751, mailed on Jun. 18, 2024. 6 pages with English translation.

(Continued)

*Primary Examiner* — Lingwen R Zeng
(74) *Attorney, Agent, or Firm* — ANOVA LAW GROUP, PLLC

(57) ABSTRACT

A driving apparatus disposed on a frame drives a rotary table to rotate. At least three carrying assemblies are disposed on the rotary table and spaced apart along a circumferential direction of the rotary table, and are configured to carry battery cells. Among the carrying assemblies, at least one is located at a loading position, at least one is located at an unloading position, and at least one is located at a pressing position. The loading position is located on a side of the pressing position facing away from a rotation direction of the rotary table. The unloading position is located on a side of the pressing position facing the rotation direction of the rotary table. A pressing assembly disposed on the frame is configured to press battery cells carried by the carrying assembly located at the pressing position so as to the battery cells.

14 Claims, 12 Drawing Sheets

(56) References Cited

FOREIGN PATENT DOCUMENTS

| | | |
|---|---|---|
| CN | 114131192 A | 3/2022 |
| CN | 114243082 A | 3/2022 |
| CN | 114678577 B | 7/2022 |
| CN | 218808987 U | 4/2023 |
| CN | 116093405 A | 5/2023 |
| CN | 116598568 A | 8/2023 |
| CN | 117080527 A | 11/2023 |
| JP | 2009037770 A | 2/2009 |
| KR | 20080025865 A | 3/2008 |

OTHER PUBLICATIONS

Written Opinion of the International Search Authority in the international application No. PCT/CN2023/134751, mailed on Jun. 18, 2024. 8 pages with English translation.

Notification of Examination Opinion on Request for Expedited Pre-Examination regarding Chinese Application No. 202311322980. 2, issued on Sep. 27, 2023. 8 pages with English translation.

Notice of Allowance of the Chinese Application No. 202311322980. 2, issued on Nov. 24, 2023. 9 pages with English translation.

\* cited by examiner

GROUPING DEVICE, GROUPING METHOD, AND BATTERY PRODUCTION LINE

CROSS-REFERENCE TO RELATED APPLICATIONS

This application is a continuation of International Application No. PCT/CN2023/134751, filed on Nov. 28, 2023, which claims priority to Chinese Patent Application No. 202311322980.2, filed on Oct. 13, 2023 and entitled "GROUPING DEVICE, GROUPING METHOD, AND BATTERY PRODUCTION LINE", which are incorporated herein by reference in their entirety.

TECHNICAL FIELD

This disclosure relates to the field of battery production technologies, and in particular, to a grouping device, a grouping method, and a battery production line.

BACKGROUND

New energy batteries have been increasingly widely used in life and industry. For example, new energy vehicles equipped with batteries have been widely used. In addition, batteries are also being increasingly used in fields such as energy storage.

In the related art, working efficiency of a grouping device for grouping battery cells is low.

SUMMARY

To resolve the foregoing technical problem, this disclosure provides a grouping device, a grouping method, and a battery production line, thereby improving working efficiency of a grouping device.

This disclosure is implemented by the following technical solutions.

A first aspect of an embodiment of this disclosure provides a grouping device, including:
  a frame provided with a loading position, an unloading position, and a pressing position;
  a driving apparatus, disposed on the frame;
  a rotary table, at least partially disposed on the driving apparatus, so that the driving apparatus drives the rotary table to rotate;
  carrying assemblies, disposed on the rotary table so as to rotate with the rotary table, where the carrying assemblies are in a quantity of at least three, the at least three carrying assemblies are spaced apart along a circumferential direction of the rotary table, the carrying assemblies are configured to carry battery cells, at least one of the carrying assemblies is located at the loading position, at least one of the carrying assemblies is located at the unloading position, and at least one of the carrying assemblies is located at the pressing position, the loading position is located on a side of the pressing position facing away from a rotation direction of the rotary table, and the unloading position is located on a side of the pressing position facing toward the rotation direction of the rotary table; and
  a pressing assembly, disposed on the frame, where the pressing assembly is configured to press battery cells carried by the carrying assembly located at the pressing position so as to group a plurality of corresponding battery cells.

In this embodiment of this disclosure, three actions of loading battery cells onto the carrying assembly located at the loading position, pressing battery cells carried by the carrying assembly located at the pressing position to form groups, and unloading at least part of battery cells carried by the carrying assembly located at the unloading position may have no interference with each other. When one of the actions is executed, the other two actions may be executed without waiting, which can improve working efficiency of the grouping device.

In an embodiment, the carrying assemblies are in a quantity of at least four, at least one of the carrying assemblies is located at a transition position, the transition position is located on a side of the unloading position facing toward the rotation direction of the rotary table, and the transition position is located on a side of the loading position facing away from the rotation direction of the rotary table.

In this embodiment of this disclosure, the battery cells carried by the carrying assembly may be respectively unloaded at the unloading position and the transition position. In a case that corresponding space at the unloading position is limited and it is inconvenient to remove all the battery cells carried by the carrying assembly located at the unloading position from the carrying assembly at one time, grouped battery cells can be removed from the carrying assembly as soon as possible to finish unloading, which is beneficial to improve working efficiency of the grouping device.

In an embodiment, the carrying assembly has a plurality of clamping portions, at least one of the clamping portions is a first clamping portion configured to clamp one of grouped battery cells, at least one of the clamping portions is a second clamping portion configured to clamp another battery cell of the grouped battery cells, an arrangement direction of the first clamping portion and the second clamping portion is a first direction; the grouping device further includes an adjusting assembly disposed on the frame, the adjusting assembly, when in a first state, is configured to adjust a distance between the first clamping portion and the second clamping portion of the carrying assembly located at the transition position along the first direction, and the adjusting assembly, when in a second state, is disengaged from the carrying assembly.

In this embodiment of this disclosure, the distance between the first clamping portion and the second clamping portion of the carrying assembly located at the transition position along the first direction is adjusted using the adjusting assembly, so that the carrying assembly can adapt to carrying battery cells of different sizes and specifications.

In an embodiment, the carrying assembly includes:
  a first base, connected to the rotary table, where an arrangement direction of a side of the first base facing toward a rotational center line of the rotary table and a side of the first base facing away from the rotational center line of the rotary table is defined as an inward-outward direction;
  a transmission apparatus, disposed on the first base; and
  carrying apparatuses, disposed on the transmission apparatus, where the carrying apparatuses are provided in plurality, the plurality of carrying apparatuses are arranged along the inward-outward direction, the clamping portions are formed on the carrying apparatuses, with the first clamping portion formed on one of the carrying apparatuses and the second clamping portion formed on another carrying apparatus, and the adjusting assembly is configured to drive the transmission apparatus so as to move the corresponding carrying apparatus, thereby bringing the first clamping portion and the second clamping portion closer to or farther apart from each other along the first direction.

In this embodiment of this disclosure, the adjusting assembly drives the transmission apparatus to move, and the moving transmission apparatus moves the corresponding carrying apparatuses to be closer to or farther apart from each other, thereby bringing a corresponding first clamping portion and second clamping portion closer to or farther apart from each other.

In an embodiment, the carrying apparatus includes:
a base, disposed on the transmission apparatus;
a first driver, disposed on the base;
first clamping pieces, disposed on the base, where the first clamping pieces are provided in plurality, the plurality of first clamping pieces are spaced apart along a second direction, the second direction intersects with the first direction, the first driver drives the first clamping piece to move along the second direction, and the clamping portion is formed on the first clamping piece;
a shared connector, connected to each of the first clamping pieces; and
second clamping pieces, connected to the base, where the second clamping pieces and the first clamping pieces are alternately arranged along the second direction, and the clamping portion is formed on the second clamping piece.

In this embodiment of this disclosure, the shared connector is connected to each of the first clamping pieces, and the first driver drives any one of the first clamping pieces to move, which can drive another corresponding first clamping piece to move together.

In an embodiment, the adjusting assembly includes:
a second base, connected to the frame;
an adjustment driving component, disposed on the second base, where when the adjusting assembly is in the first state, the adjustment driving component is disposed on the corresponding carrying assembly, and the adjustment driving component drives the corresponding carrying assembly to move, thereby adjusting a distance between the corresponding first clamping portion and the corresponding second clamping portion along the first direction, and when the adjusting assembly is in the second state, the adjustment driving component is disengaged from the carrying assembly; and
a switch driving component, disposed on the second base, where the switch driving component is configured to drive the adjustment driving component to move, thereby enabling the adjusting assembly to switch between the first state and the second state.

In this embodiment of this disclosure, the adjustment driving component and the switch driving component drive independently to respectively implement corresponding functions. The switch driving component drives the adjustment driving component to move, thereby enabling the adjusting assembly to switch between the first state and the second state. When the adjusting assembly is in the first state, the adjustment driving component drives the carrying assembly to move, thereby adjusting the distance between the first clamping portion and the second clamping portion.

In an embodiment, the pressing assembly includes:
a support apparatus, at least partially disposed on the frame;
a first pressing apparatus, disposed on the support apparatus;
a first driving part, disposed on the support apparatus, where the first driving part is configured to drive the first pressing apparatus to move to a corresponding predetermined position and stay at the predetermined position, thereby enabling the first pressing apparatus to come in contact with grouped battery cells of different sizes;
a second driving part, disposed on the support apparatus; and
a second pressing apparatus, at least partially disposed on the second driving part, where an arrangement direction of the first pressing apparatus and the second pressing apparatus intersects with a vertical direction, and the second driving part is configured to drive the second pressing apparatus to move toward the first pressing apparatus, thereby applying pressure between two grouped battery cells.

In this embodiment of this disclosure, for the battery cells of different sizes and specifications, predetermined positions of the first pressing apparatus are different. The first pressing apparatus is driven, using the first driving part, to move to the predetermined position, thereby enabling the first pressing apparatus and the second pressing apparatus to adapt to pressing the battery cells of different sizes and specifications to form groups.

In an embodiment, the pressing assembly further includes:
a second driver, disposed on the support apparatus;
a mounting base, disposed on the second driver, where the mounting base is located above the carrying assembly, and the second driver is configured to drive the mounting base to move along the vertical direction; and
a roller, rotatably connected to the mounting base, where the roller protrudes downward from the mounting base, and the roller is located above the carrying assembly.

In this embodiment of this disclosure, the mounting base and the roller on the mounting base are driven using the second driver to move up and down together, which can apply pressure to an upper end of the battery cell. The roller can reduce friction at the upper end of the battery cell.

In an embodiment, the support apparatus includes:
a support body, where the first pressing apparatus, the first driving part, and the second driving part are all disposed on the support body; and
an auxiliary support base, connected to the rotary table, where the support body is rotatably connected to the auxiliary support base, and a rotational center line about which the auxiliary support base rotates relative to the support body is coaxial with the rotational center line of the rotary table.

In this embodiment of this disclosure, the rotational center line about which the auxiliary support base rotates relative to the support body is coaxial with the rotational center line of the rotary table. In a case that the support body is well supported by the rotary table using the auxiliary support base, the support body does not rotate along with the auxiliary support base.

In an embodiment, along the circumferential direction of the rotary table, a central angle of every two adjacent carrying assemblies relative to the rotational center line of the rotary table is a predetermined angle, and the predetermined angles are equal.

In this embodiment of this disclosure, each carrying apparatus is enable to conveniently switch between the loading position, the pressing position, and the unloading position.

A second aspect of an embodiment of this disclosure provides a grouping method, where the grouping method includes:

loading: loading battery cells onto a carrying assembly located at a loading position;

driving, using a driving apparatus, a rotary table to rotate, thereby enabling each carrying assembly to sequentially circulate between the loading position, a pressing position, and an unloading position along a circumferential direction of the rotary table;

pressing: pressing, using a pressing assembly, battery cells carried by a carrying assembly located at the pressing position so as to group the battery cells carried by the carrying assembly located at the pressing position; and unloading: removing at least part of battery cells carried by a carrying assembly located at the unloading position from the carrying assembly; where an execution period of the step of loading, an execution period of the step of pressing, and an execution period of the step of unloading at least partially overlap.

In this embodiment of this disclosure, the execution period of the step of loading, the execution period of the step of pressing, and the execution period of the step of unloading at least partially overlap. The step of loading, the step of pressing, and the step of unloading may be at least partially executed at the same time without waiting, which is beneficial to improve working efficiency of a grouping device.

In an embodiment, the grouping method further includes: adjusting, using an adjusting assembly in a first state, a distance between a first clamping portion and a second clamping portion of a vacant carrying assembly located at a transition position along a first direction.

In this embodiment of this disclosure, the distance between the first clamping portion and the second clamping portion is adjusted using the adjusting assembly, so that the distance between the first clamping portion and the second clamping portion can adapt to clamping of battery cells of different sizes and specifications.

In an embodiment, the grouping method further includes: driving, using a first driving part, a first pressing apparatus to move to a corresponding predetermined position, thereby enabling the first pressing apparatus to come in contact with grouped battery cells of different sizes.

In this embodiment of this disclosure, the first pressing apparatus is driven, using the first driving part, to move to the corresponding predetermined position, and the first pressing apparatus comes in contact with the grouped battery cells of different sizes at the corresponding predetermined position, thereby enabling the first pressing apparatus and a second pressing apparatus to adapt to pressing the battery cells of different sizes and specifications to form groups.

A third aspect of an embodiment of this disclosure provides a battery production line, including:

a grouping device according to any one of the foregoing aspects;

a loading device, configured to transfer battery cells onto a carrying assembly located at the loading position; and an unloading device, configured to remove battery cells from a carrying assembly located at the unloading position.

In this embodiment of this disclosure, the carrying assembly located at the loading position is loaded using the loading device. The battery cells carried by the carrying assembly located at the unloading position are removed using the unloading device.

Beneficial effects of the embodiments of this disclosure are as follows:

according to the embodiments of this disclosure, the driving apparatus drives the rotary table so as to move the carrying assembly and the battery cells carried by the carrying assembly to rotate together. At least three carrying assemblies are spaced apart along the circumferential direction of the rotary table. Even if different actions are executed on three carrying assemblies at different positions, mechanisms that execute different actions on battery cells on the three carrying assemblies at different positions have no interference with each other and may perform executions at the same time. Therefore, the three steps of loading the battery cells onto the carrying assembly located at the loading position, pressing, using the pressing assembly, the battery cells carried by the carrying assembly located at the pressing position to form groups, and removing the battery cells from the carrying assembly located at the unloading position may be performed at the same time without waiting. A carrying assembly corresponding to the battery cells that are loaded at the loading position rotates to the pressing position using the rotary table, a carrying assembly corresponding to the battery cells that are pressed to form groups at the pressing position rotates to the unloading position using the rotary table, and a carrying assembly corresponding to the battery cells that are removed at the unloading position rotates to the loading position using the rotary table, so that a finally vacant carrying assembly can return to the loading position for loading, and the three actions of loading, pressing to form groups, and unloading are executed at the same time without interference, thereby improving efficiency of grouping the battery cells by the grouping device, that is, improving working efficiency of the grouping device. In addition, the carrying assembly circulates between the loading position, the pressing position, and the unloading position. A corresponding pressing assembly is disposed only at the pressing position, and a pressing assembly does not need to be disposed at another position such as the loading position and the unloading position, thereby reducing costs.

BRIEF DESCRIPTION OF DRAWINGS

Persons of ordinary skill in the art will be clear about various other advantages and benefits by reading the detailed description of embodiments below. The accompanying drawings are merely intended to illustrate some embodiments and are not intended to limit this disclosure. Moreover, throughout the accompanying drawings, the same reference signs represent the same parts. In the accompanying drawings.

Figure 1:
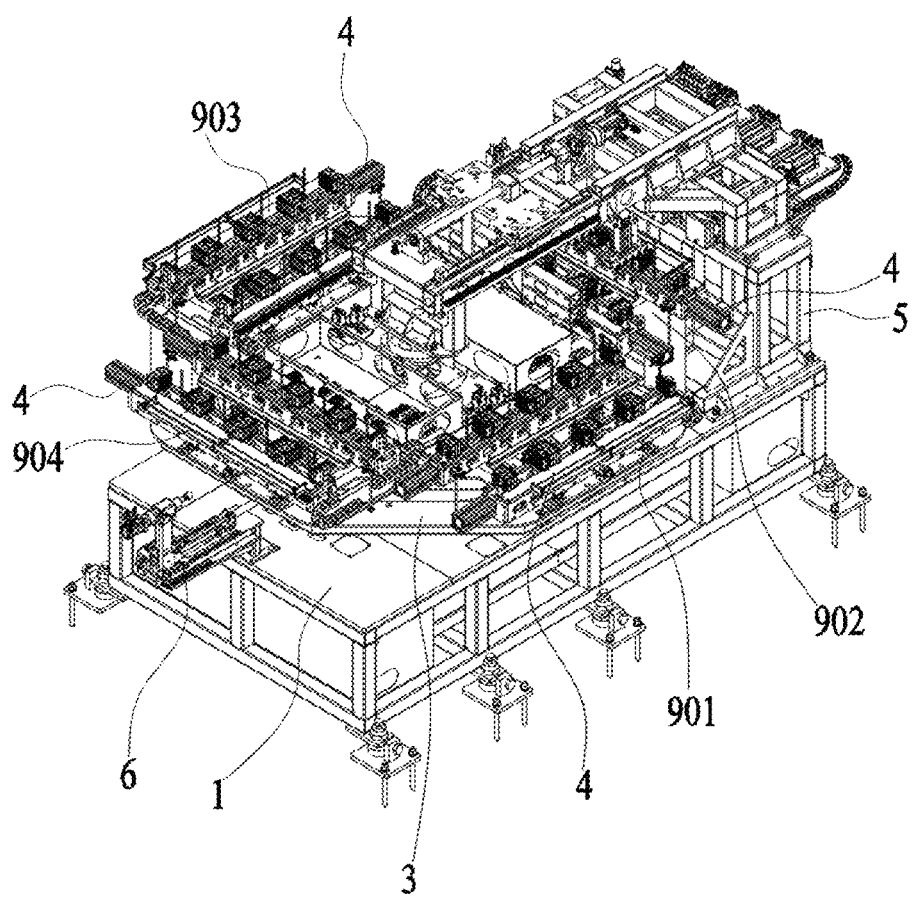
FIG. 1 is a schematic structural diagram of a grouping device according to an embodiment of this disclosure, and a driving apparatus is not shown in the figure.

REFERENCE SIGNS ARE DESCRIBED AS FOLLOWS frame 1; driving apparatus 2; rotary table 3; first rotational center line 31; carrying assembly 4; first clamping portion 41; second clamping portion 42; first base 43; transmission apparatus 44; carrying apparatus 45; base 451; first driver 452; first clamping piece 453; mounting portion 4531; shared connector 454; second clamping piece 455; pressing assembly 5; support apparatus 51; support body 511; auxiliary support base 512; first pressing apparatus 52; first driving part 53; second driving part 54; second pressing apparatus 55; second driver 56; mounting base 57; roller 58; adjusting assembly 6; second base 61; adjustment driving component 62; switch driving component 63; predetermined angle α; loading position 901; pressing position 902; unloading position 903; transition position 904; and battery cell 905.

DESCRIPTION OF EMBODIMENTS

The following describes in detail the embodiments of the technical solutions in this disclosure with reference to the accompanying drawings. The following embodiments are merely used to describe the technical solutions in this disclosure more clearly, and therefore are merely used as examples and do not constitute any limitation on the protection scope of this disclosure.

Unless otherwise defined, all technical and scientific terms used herein shall have the same meanings as commonly understood by those skilled in the art to which this disclosure relates. The terms used herein are intended to merely describe the specific embodiments rather than to limit this disclosure. The terms "include", "comprise", and "have" and any other variations thereof in the embodiments of this disclosure are intended to cover non-exclusive inclusions.

In the description of the embodiments of this disclosure, the technical terms "first", "second", "third", and the like are merely intended to distinguish between different objects, and shall not be understood as any indication or implication of relative importance or any implicit indication of the number, specific sequence, or primary-secondary relationship of the technical features indicated. In the description of the embodiments of this disclosure, "a plurality of" means at least two, unless otherwise specifically defined.

In this specification, reference to "embodiment" means that specific features, structures, or characteristics described with reference to the embodiment may be incorporated in at least one embodiment of this disclosure. The word "embodiment" appearing in various places in this specification does not necessarily refer to the same embodiment or an independent or alternative embodiment that is exclusive of other embodiments. Persons skilled in the art explicitly and implicitly understand that the embodiments described herein may be combined with other embodiments.

In the description of the embodiments of this disclosure, the term "and/or" is only an associative relationship for describing associated objects, indicating that three relationships may be present. For example, A and/or B may indicate the following three cases: presence of only A, presence of both A and B, and presence of only B. In addition, a character "/" in this specification generally indicates an "or" relationship between contextually associated objects.

In the description of the embodiments of this disclosure, unless otherwise specified and defined explicitly, the technical terms such as "mounting", "connection", "join", and "fastening" should be understood in their general senses. For example, they may refer to a fixed connection, a detachable connection, or an integral connection, may refer to a mechanical connection or an electrical connection, may refer to a direct connection or an indirect connection via an intermediate medium, and may refer to an internal communication between two elements or an interaction between two elements. Persons of ordinary skill in the art can understand specific meanings of these terms in the embodiments of this disclosure as appropriate to specific situations.

In the description of the embodiments of this disclosure, unless otherwise specified and defined explicitly, the technical term "contact" should be understood in its general sense. It may refer to direct contact or contact via an intermediate medium, and may refer to contact in which there is substantially no interaction force between the two contacting objects or contact in which there is interaction force between the two contacting objects.

Figure 2:
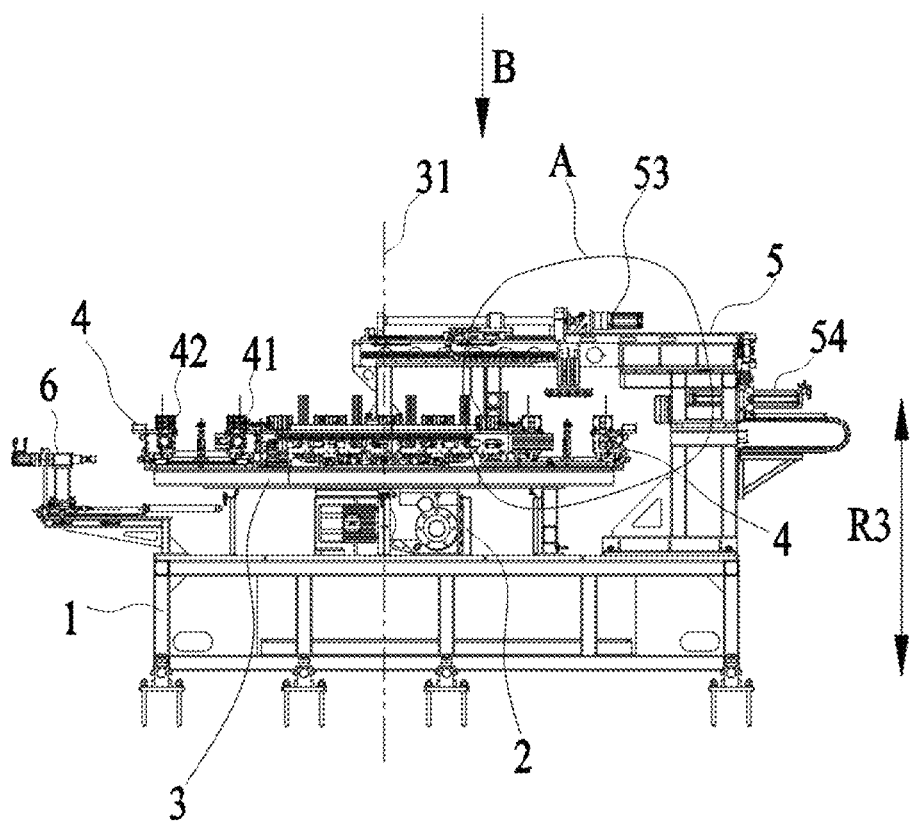
FIG. 2 is a schematic structural diagram of a grouping device according to an embodiment of this disclosure, a driving apparatus is shown in the figure, and an adjusting assembly shown in the figure is in a second state.
Figure 3:
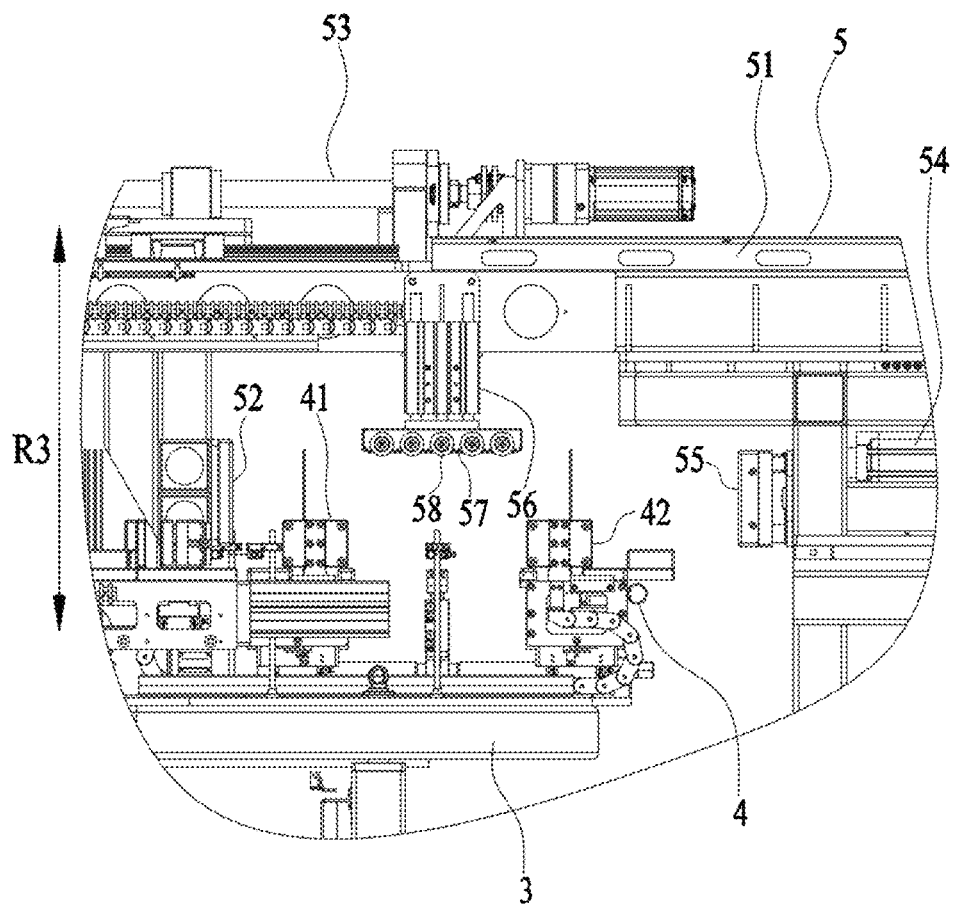
FIG. 3 is an enlarged view of position A in FIG. 2.
Figure 4:
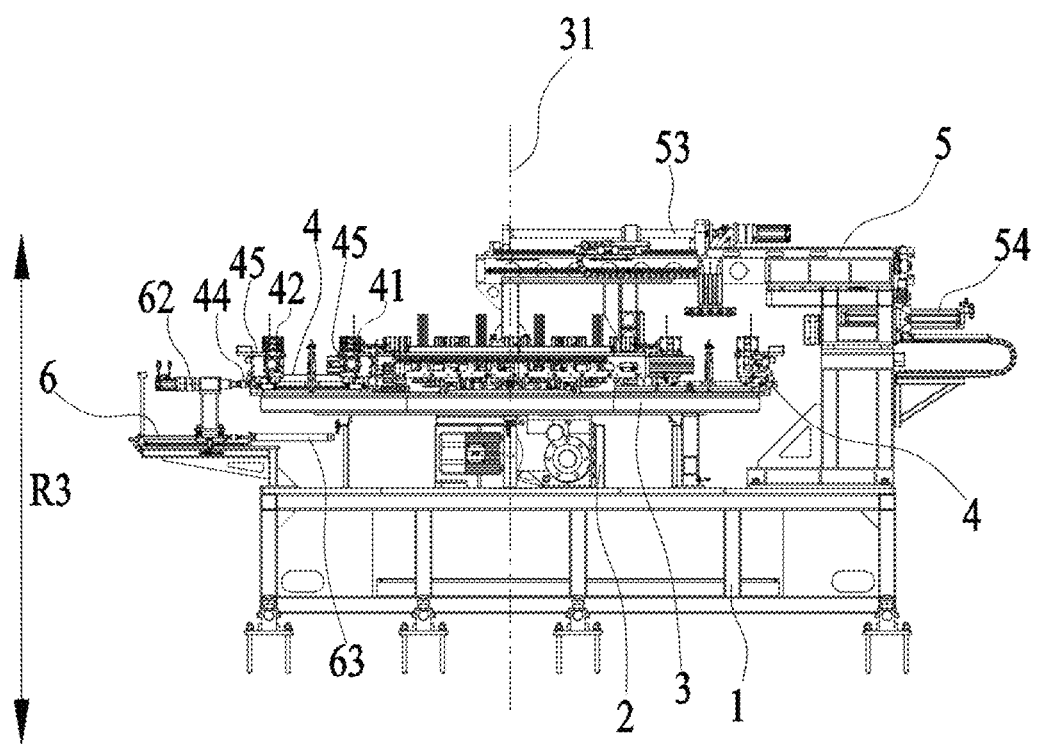
FIG. 4 is a schematic structural diagram of a grouping device according to an embodiment of this disclosure, a driving apparatus is shown in the figure, and an adjusting assembly shown in the figure is in a first state.

In the description of the embodiments of this disclosure, it should be understood that the orientations or positional relationships indicated by the terms "upper", "lower", "top", "bottom", and the like are based on the orientations or positional relationships shown in FIG. 2 to FIG. 4. These terms are merely for ease and brevity of description of this disclosure rather than indicating or implying that the apparatuses or elements mentioned must have specific orientations or must be constructed or manipulated according to specific orientations, and therefore shall not be construed as any limitations on this disclosure.

At present, new energy batteries have been increasingly widely used in life and industry. New energy batteries have been widely used in energy storage power supply systems such as hydroelectric power plants, thermal power plants, wind power plants, and solar power plants, as well as in many other fields including electric transportation tools such as electric bicycles, electric motorcycles, and electric vehicles, and aerospace. With the continuous expansion of application fields of traction batteries, market demands for traction batteries are also increasing.

As a part of the creative concept of this disclosure, before describing the embodiments of this disclosure, it is needed to analyze the reasons for the low working efficiency in the related art, to obtain the technical solutions of the embodiments of this disclosure through reasonable analysis.

In the related art, a thermal insulation pad is attached between two battery cells, and the two battery cells are pressed to form group so as to bond the two battery cells together to form a battery cell unit. A grouping device has two stations, and each station is provided with a pressing assembly to press battery cells in a corresponding station to form groups. Each station works independently, and loading, pressing to form groups, and unloading of battery cells are all executed at the same station. In a process of loading the battery cells onto the corresponding station, the station is unable to press the battery cells to form groups or unload the battery cells, and needs to wait until the battery cells are loaded, and then presses using the corresponding pressing assembly. In a process of pressing the battery cells to form groups, the station is unable to load or unload the battery cells, and needs to wait until the pressing assembly presses the battery cells to form groups, and then unloads the grouped battery cells. In a process of unloading the battery cells, the station is unable to load the battery cells or press the battery cells to form groups, and needs to wait until the grouped battery cells are unloaded, and then loads the battery cells onto the corresponding station. Therefore, the loading, pressing to form groups, and unloading of the battery cells cannot be executed at the same time. Every time the grouping device executes an action on the battery cells, another action needs to wait for execution, resulting in low efficiency of grouping the battery cells by the grouping device, that is, working efficiency of the grouping device is low.

According to the embodiments of this disclosure, the rotary table rotates to drive the carrying assembly carrying the battery cells to constantly switch between the loading position, the pressing position, and the unloading position. The battery cells may be loaded onto the carrying assembly located at the loading position. The battery cells carried by the carrying assembly located at the pressing position may be pressed, using the pressing assembly, to form groups. The battery cells carried by the carrying assembly located at the unloading position may be removed from the carrying assembly. The loading, pressing to form groups, and unloading of the battery cells are executed at different positions. The loading, pressing to form groups, and unloading of the battery cells have no interference with each other. Therefore, the loading, pressing to form groups, and unloading of the battery cells may be executed at the same time without waiting, thereby improving working efficiency.

The solutions of the embodiments of this disclosure may be applied to, but is not limited to, pressing battery cells to form groups, and may further be applied to a pressing process of another object.

An electric apparatus is an apparatus that uses electric energy as energy and implements a corresponding function by consuming the electric energy. For example, the electric apparatus may be, but is not limited to, a mobile phone, a tablet, a laptop computer, an electric toy, an electric tool, an electric bicycle, an electric car, a ship, or a spacecraft. The electric toy may include a fixed or mobile electric toy, for example, a game console, an electric toy car, an electric toy ship, and an electric toy airplane. The spacecraft may include an airplane, a rocket, a space shuttle, a spaceship, or the like.

An example in which an electric apparatus of an embodiment of this disclosure is a vehicle is used for description.

The vehicle provided by this embodiment of this disclosure may be an oil-fueled vehicle, a gas-powered vehicle, or a new energy vehicle. The new energy vehicle may be a battery electric vehicle, a hybrid electric vehicle, an extended-range electric vehicle, or the like. The vehicle is provided with a battery pack inside, where the battery pack may be disposed at the bottom, front, or rear of the vehicle. The battery pack may be configured to supply power to the vehicle. For example, the battery pack may be used as an operational power supply for the vehicle. The vehicle may further include a controller and a motor. The controller may be configured to control the battery pack to supply power to the motor. For example, the battery pack may be configured to meet power usage requirements of the vehicle for starting, navigating, and driving.

In some embodiments of this disclosure, the battery pack can be used as not only the operational power supply for the vehicle but also a driving power supply for the vehicle, replacing or partially replacing fossil fuel or natural gas to provide driving traction for the vehicle.

The battery pack includes one or more battery cells 905.

If the battery cells 905 are provided in plurality, the plurality of battery cells 905 may be connected in series, parallel, or series-parallel, where being connected in series-parallel means a combination of series and parallel connections of the plurality of battery cells 905. A battery module may be first formed by connecting the plurality of battery cells 905 in series, parallel, or series-parallel. A plurality of battery modules are connected in series, parallel, or series-parallel to form an entirety, and the entirety formed by the plurality of battery modules connected in series, parallel, or series-parallel is accommodated in a box. The battery pack may further include other structures. For example, the battery pack may further include a busbar configured to implement electrical connection between the plurality of battery cells 905.

For a dual-row battery module, the battery cells 905 first need to be bonded and pressed together to form grouped units. The grouped units are stacked into the dual-row battery modules, and then the dual-row battery modules are combined into a corresponding battery pack.

The battery cell 905 is a basic unit that can implement a mutual conversion between chemical energy and electric energy.

In the embodiments of this disclosure, the battery cell 905 may be a secondary battery, and the secondary battery is the battery cell 905 that can be continuously used by activating an active material via charging after the battery cell 905 is discharged.

In the embodiments of this disclosure, the battery cell 905 may be a lithium-ion battery, a sodium-ion battery, a sodium-lithium-ion battery, a lithium metal battery, a sodium metal battery, a lithium-sulfur battery, a magnesium-ion battery, a nickel-metal hydride battery, a nickel-cadmium battery, a lead-acid battery, or the like, which is not limited in the embodiments of this disclosure.

Figure 5:
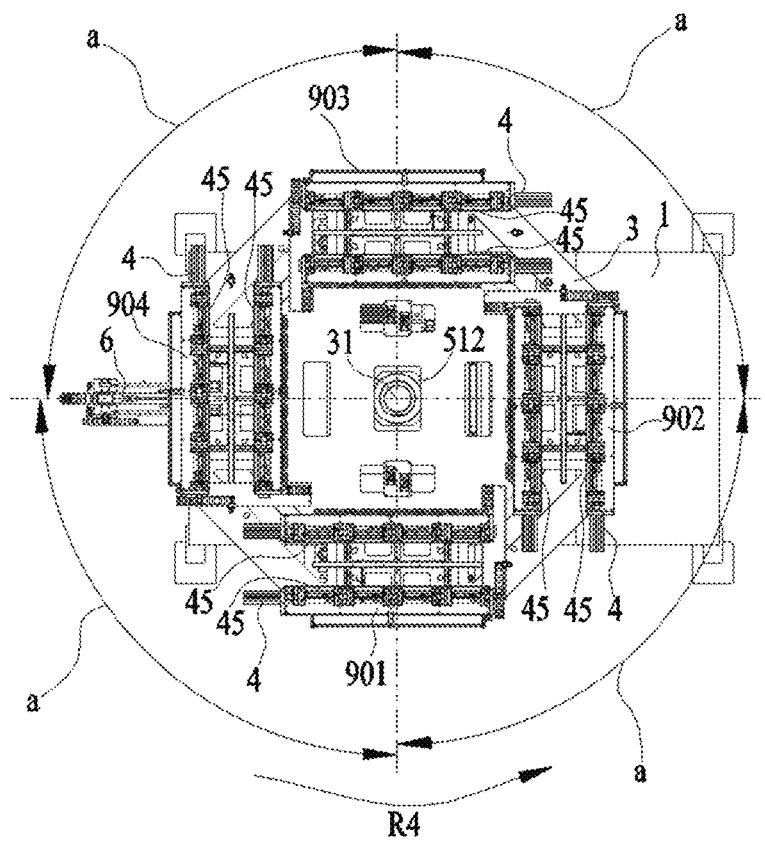
FIG. 5 is a B-direction view of FIG. 2, and other parts of a pressing assembly except an auxiliary support base are omitted in the figure.

For the battery production line of the embodiments of this disclosure, referring to FIG. 1 and FIG. 5, the battery production line includes a grouping device, a loading device, and an unloading device. The loading device is configured to load battery cells onto the grouping device, and the unloading device is configured to unload grouped battery cells in the grouping device.

For the grouping device of the embodiments of this disclosure, referring to FIG. 1 to FIG. 5, the grouping device includes a frame 1, a driving apparatus 2, a rotary table 3, a carrying assembly 4, and a pressing assembly 5. The frame 1 includes a loading position 901, an unloading position 903, and a pressing position 902. The driving apparatus 2 is disposed on the frame 1. The rotary table 3 is at least partially disposed on the driving apparatus 2, so that the driving apparatus 2 drives the rotary table 3 to rotate. The carrying assemblies 4 are disposed on the rotary table 3 so as to rotate with the rotary table 3, where the carrying assemblies 4 are in a quantity of at least three, the at least three carrying assemblies 4 are spaced apart along a circumferential direction of the rotary table 3, the carrying assemblies 4 are configured to carry battery cells 905, at least one of the carrying assemblies 4 is located at the loading position 901, at least one of the carrying assemblies 4 is located at the unloading position 903, and at least one of the carrying assemblies 4 is located at the pressing position 902, the loading position 901 is located on a side of the pressing position 902 facing away from a rotation direction of the rotary table 3, and the unloading position 903 is located on a side of the pressing position 902 facing toward the rotation direction of the rotary table 3. The pressing assembly 5 is disposed on the frame 1, where the pressing assembly 5 is configured to press battery cells 905 carried by the carrying assembly 4 located at the pressing position 902 so as to group a plurality of corresponding battery cells 905.

In this embodiment of this disclosure, referring to FIG. 5, the rotation direction of the rotary table is a direction indicated by arrow R4.

The frame 1 is mainly configured to support another structure of the grouping device.

The driving apparatus 2 provides power for the rotary table 3 to rotate.

For example, the driving apparatus 2 may be a motor.

For example, the driving apparatus 2 may be a combination of a motor and a mechanism for transmission. For example, the driving apparatus 2 may be a combination of a motor and a cam divider.

The rotary table 3 is a structure that can rotate relative to the frame 1, and the rotary table 3 is driven, using the driving apparatus 2, to rotate relative to the frame 1. The rotary table 3 is configured to drive the carrying assembly 4 to rotate.

The carrying assembly 4 is a structure with a specific carrying capacity. The carrying assembly 4 is configured to carry the battery cell 905. A gravity load of the battery cell 905 acts on the carrying assembly 4, and the carrying assembly 4 needs to carry the gravity load of the battery cell 905.

The battery cell 905 is carried by the carrying assembly 4, and the rotary table 3 rotates to drive the carrying assembly 4 and the battery cell 905 carried by the carrying assembly 4 to rotate together.

The carrying assemblies 4 are in a quantity of at least three, and the carrying assemblies 4 may be in a quantity of three or more.

For example, the carrying assemblies 4 may be in a quantity of three, four, five, seven, or ten.

For example, the loading device is configured to transfer the battery cells 905 onto a carrying assembly 4 located at the loading position 901. The unloading device is configured to remove the battery cells 905 from a carrying assembly 4 located at the unloading position 903.

The pressing assembly 5 is a structure capable of applying specific pressure to a to-be-processed object. For example, the pressing assembly 5 applies specific pressure to the battery cells 905 so as to press the battery cells 905 to form groups.

The loading position 901 is configured to load the battery cells 905 onto a position corresponding to the carrying assembly 4.

At least one of the carrying assemblies 4 is located at the loading position 901, and the rotary table 3 may rotate to drive at least one of the carrying assemblies 4 to rotate to the loading position 901.

At least one of the carrying assemblies 4 is located at the pressing position 902, and the rotary table 3 may rotate to drive at least one of the carrying assemblies 4 to rotate to the pressing position 902.

At least one of the carrying assemblies 4 is located at the unloading position 903, and the rotary table 3 may rotate to drive at least one of the carrying assemblies 4 to rotate to the unloading position 903.

In this embodiment of this disclosure, the rotary table 3 is driven, using the driving apparatus 2, to drive the carrying assembly 4 and the battery cell 905 carried by the carrying assembly 4 to rotate together. The at least three carrying assemblies 4 are spaced apart along the circumferential direction of the rotary table 3. Even if different actions are executed on three carrying assemblies 4 at different positions, mechanisms that execute different actions on battery cells 905 on the three carrying assemblies 4 at different positions have no interference with each other and may perform executions at the same time. Therefore, the three steps of loading the battery cells 905 onto the carrying assembly 4 located at the loading position 901, pressing, using the pressing assembly 5, the battery cells 905 carried by the carrying assembly 4 located at the pressing position 902 to form groups, and removing the battery cells 905 from the carrying assembly 4 located at the unloading position 903 may be performed at the same time without waiting. A carrying assembly 4 corresponding to the battery cells 905 that are loaded at the loading position 901 rotates to the pressing position 902 using the rotary table 3, a carrying assembly 4 corresponding to the battery cells 905 that are pressed to form groups at the pressing position 902 rotates to the unloading position 903 using the rotary table 3, and a carrying assembly 4 corresponding to battery cells 905 that are removed at the unloading position 903 rotates using the rotary table 3, so that a finally vacant carrying assembly 4 can return to the loading position 901 for loading, and the three actions of loading, pressing to form groups, and unloading are executed at the same time without interference, thereby improving efficiency of grouping the battery cells 905 by the grouping device, that is, improving working efficiency of the grouping device. In addition, the carrying assembly circulates between the loading position, the pressing position, and the unloading position. A corresponding pressing assembly is disposed only at the pressing position, and a pressing assembly does not need to be disposed at another position such as the loading position and the unloading position, thereby reducing costs.

In an embodiment, referring to FIG. 1 and FIG. 5, the carrying assemblies 4 are in a quantity of at least four, at least one of the carrying assemblies 4 is located at a transition position 904, the transition position 904 is located on a side of the unloading position 903 facing toward the rotation direction of the rotary table 3, and the transition position 904 is located on a side of the loading position 901 facing away from the rotation direction of the rotary table 3.

For example, the carrying assemblies 4 may be in a quantity of four, five, seven, nine, or ten.

At least one of the carrying assemblies 4 is located at the transition position 904, and the rotary table 3 may rotate to drive at least one of the carrying assemblies 4 to rotate to the transition position 904.

In this embodiment of this disclosure, the battery cells 905 that are pressed to form groups may be taken in two times. A corresponding carrying assembly 4 carrying the battery cells 905 that are pressed to form groups rotates to the unloading position 903 to remove part of the battery cells 905 from the carrying assembly 4, and the carrying assembly 4 located at the unloading position 903 rotates to the transition position 904 to remove the battery cells 905 on the carrying assembly 4 rotating from the unloading position 903 to the transition position 904 from the carrying assembly 4. The removing of the battery cells 905 from the carrying assembly 4 located at the unloading position 903 and the removing of the battery cells 905 from the carrying assembly 4 located at the transition position 904 may be executed at the same time. In a case that corresponding space at the unloading position 903 is limited and it is inconvenient to remove all the battery cells 905 carried by the carrying assembly 4 located at the unloading position 903 from the carrying assembly 4 at one time, grouped battery cells 905 can be removed from the carrying assembly 4 as soon as possible to finish unloading, which is beneficial to improve working efficiency of the grouping device.

In an embodiment, referring to FIG. 2 to FIG. 4, and FIG. 6, the carrying assembly 4 has a plurality of clamping portions, at least one of the clamping portions is a first clamping portion 41 configured to clamp one of grouped battery cells 905, at least one of the clamping portions is a second clamping portion 42 configured to clamp another battery cell 905 of the grouped battery cells 905, an arrangement direction of the first clamping portion 41 and the second clamping portion 42 is a first direction; the grouping device further includes an adjusting assembly 6 disposed on the frame 1, the adjusting assembly 6, when in a first state, is configured to adjust a distance between the first clamping portion 41 and the second clamping portion 42 of the carrying assembly 4 located at the transition position 904 along the first direction, and the adjusting assembly 6, when in a second state, is disengaged from the carrying assembly 4.

Figure 6:
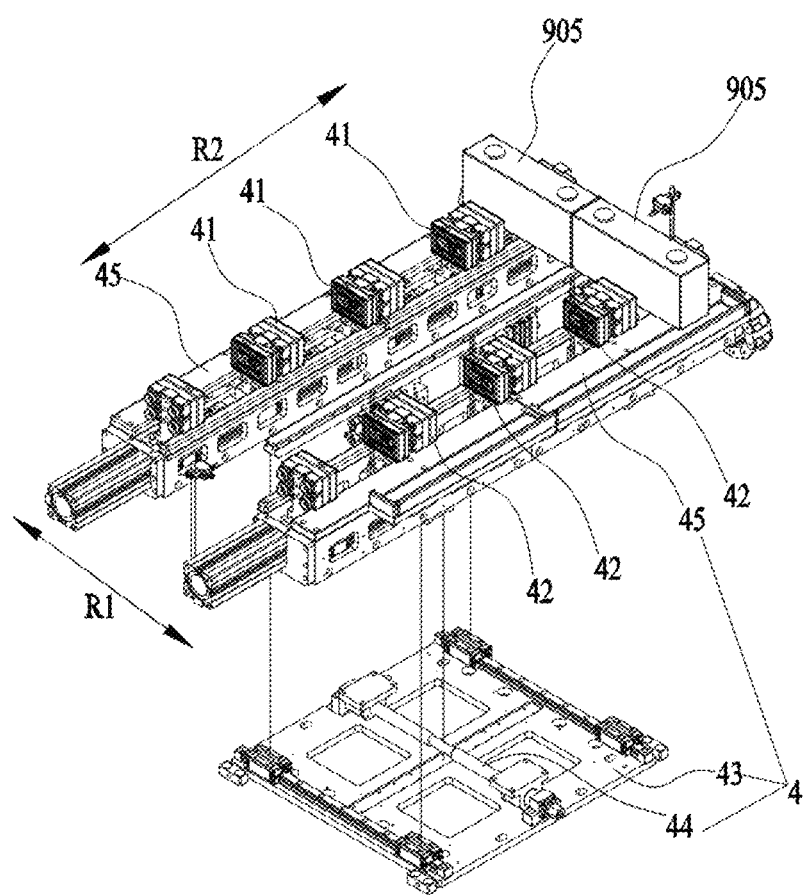
FIG. 6 is a schematic structural diagram of a carrying assembly according to an embodiment of this disclosure.

In this embodiment of this disclosure, referring to FIG. 6, the first direction is a direction indicated by arrow R1.

The grouped battery cells 905 have a variety of different sizes and specifications, and the distance between the first clamping portion 41 and the second clamping portion 42 along the first direction needs to be adjusted accordingly so as to adapt to clamping of two grouped battery cells 905 with different sizes and specifications.

For example, referring to FIG. 4, the adjusting assembly 6 shown in the figure is in the first state.

For example, referring to FIG. 2, the adjusting assembly 6 shown in the figure is in the second state.

In this embodiment of this disclosure, all the battery cells 905 carried by the carrying assembly 4 located at the unloading position 903 may be removed from the carrying assembly 4. When the carrying assembly 4 located at the unloading position 903 rotates to the transition position 904, the carrying assembly 4 located at the transition position 904 no longer carries the battery cell 905. Part of the battery cells 905 carried by the carrying assembly 4 located at the unloading position 903 may be removed from the carrying assembly 4. When the carrying assembly 4 located at the unloading position 903 rotates to the transition position 904, all the battery cells 905 carried by the carrying assembly 4 located at the transition position 904 may be removed from the carrying assembly 4, and the carrying assembly 4 located at the transition position 904 may carry no battery cell 905. Therefore, whether all the battery cells 905 carried by the carrying assembly 4 located at the unloading position 903 are unloaded, or part of the battery cells 905 carried by the carrying assembly 4 located at the unloading position 903 are unloaded, all the carried battery cells 905 are unloaded and removed even if the carrying assembly 4 finally located at the transition position 904 still carries the battery cells 905. The carrying assembly 4 located at the transition position 904 may be in a state of carrying no battery cell 905, and the adjusting assembly 6 may adjust the carrying assembly 4 that is located at the transition position 904 and carries no battery cell 905. When the adjusting assembly 6 is in the first state, the distance between the first clamping portion 41 and the second clamping portion 42 of the carrying assembly 4 located at the transition position 904 along the first direction is adjusted using the adjusting assembly 6, thereby enabling the carrying assembly 4 to adapt, using the first clamping portion 41 and the second clamping portion 42, to clamping two grouped battery cells 905 of different sizes and specifications. When the adjusting assembly 6 is in the second state, the adjusting assembly 6 is disengaged from the carrying assembly 4, and the adjusting assembly 6 disengaged from the carrying assembly 4 has no effect on the rotary table 3 driving the carrying assembly 4 to rotate. When all the battery cells 905 carried by the carrying assembly 4 located at the unloading position 903 can be removed from the carrying assembly 4 at one time, the adjusting assembly 6 can adjust the first clamping portion 41 and the second clamping portion 42 that are corresponding to the carrying assembly 4 rotating to the transition position 904 without waiting, which is beneficial to improve working efficiency.

It can be understood that the grouping device of the embodiments of this disclosure is not limited to being provided with the adjusting assembly 6. For example, the grouping device may not be provided with the adjusting assembly 6. For example, the battery cells 905 carried by the carrying assembly 4 may be unloaded using the unloading position 903 and the transition position 904.

In an embodiment, referring to FIG. 2 to FIG. 5, and FIG. 6, the carrying assembly 4 includes a first base 43, a transmission apparatus 44, and a carrying apparatus 45. The first base 43 is connected to the rotary table 3, and an arrangement direction of a side of the first base 43 facing toward a rotational center line of the rotary table 3 and a side of the first base 43 facing away from the rotational center line of the rotary table 3 is defined as an inward-outward direction. The transmission apparatus 44 is disposed on the first base 43. The carrying apparatus 45 is disposed on the transmission apparatus 44, where the carrying apparatuses 45 are provided in plurality, the plurality of carrying apparatuses 45 are arranged along the inward-outward direction, the clamping portions are formed on the carrying apparatuses 45, with the first clamping portion 41 formed on one of the carrying apparatuses 45 and the second clamping portion 42 formed on another carrying apparatus 45, and the adjusting assembly 6 is configured to drive the transmission apparatus 44 so as to move the corresponding carrying apparatus 45, thereby bringing the first clamping portion 41 and the second clamping portion 42 closer to or farther apart from each other along the first direction.

For example, referring to FIG. 6, a shape of the first base 43 may be plate-shaped.

For example, the transmission apparatus 44 may be a screw pair structure having two threads in opposite directions.

For example, referring to FIG. 5 and FIG. 6, the carrying apparatuses 45 of each carrying assembly 4 are in a quantity of two, where one of the carrying apparatuses 45 is located on a side of the other carrying apparatus 45 facing away from the rotational center line of the rotary table 3.

For example, referring to FIG. 2, FIG. 4, and FIG. 5, the rotational center line of the rotary table 3 is a first rotational center line 31.

In this embodiment of this disclosure, the first base 43 is connected to the rotary table 3, and the transmission apparatus 44 is carried using the first base 43. The adjusting assembly 6 in the first state provides power for the transmission apparatus 44 to drive the transmission apparatus 44 to move, and the moving transmission apparatus 44 moves the corresponding carrying apparatus 45, thereby bringing the first clamping portion 41 and the second clamping portion 42 located at different carrying apparatuses 45 closer to or farther apart from each other, so as to implement the adjustment of the distance between the first clamping portion 41 and the second clamping portion 42 along the first direction.

Figure 7:
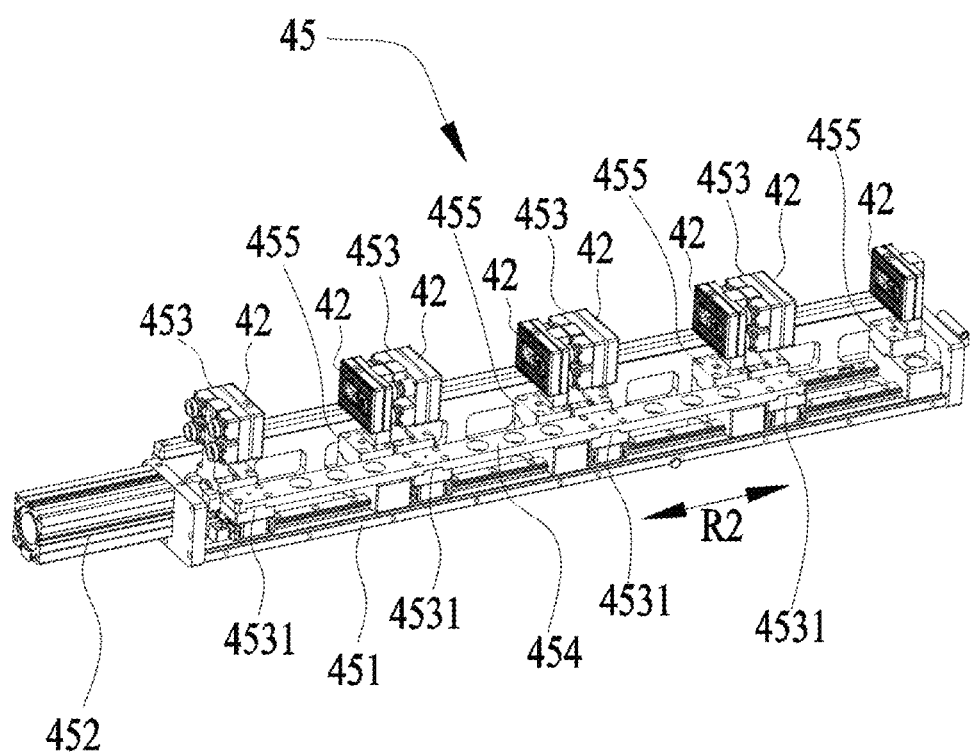
FIG. 7 is a schematic structural diagram of a carrying apparatus according to an embodiment of this disclosure.

In an embodiment, referring to FIG. 7, the carrying apparatus 45 includes a base 451, a first driver 452, a first clamping piece 453, a shared connector 454, and a second clamping piece 455. The base 451 is disposed on the transmission apparatus 44. The first driver 452 is disposed on the base 451. The first clamping pieces 453 are disposed on the base 451, where the first clamping pieces 453 are provided in plurality, the plurality of first clamping pieces 453 are spaced apart along a second direction, the second direction intersects with the first direction, the first driver 452 drives the first clamping piece 453 to move along the second direction, and the clamping portions are formed on the first clamping piece 453. The shared connector 454 is connected to each of the first clamping pieces 453. The second clamping pieces 455 are connected to the base 451, where the second clamping pieces 455 and the first clamping pieces 453 are alternately arranged along the second direction, and the clamping portion is formed on the second clamping piece 455.

In this embodiment of this disclosure, referring to FIG. 6 and FIG. 7, the second direction is a direction indicated by arrow R2.

The base 451 is a main structure supporting another structure of the carrying apparatus 45, and the transmission apparatus 44 moves the base 451 so as to move the carrying apparatus 45 integrally.

For example, the first driver 452 may be an air cylinder or an oil cylinder.

For example, a shape of the shared connector 454 may be rod-shaped or plate-shaped.

For example, referring to FIG. 7, the first clamping piece 453 has a mounting portion 4531, and the shared connector 454 is connected to the mounting portion 4531.

For example, the first clamping portion 41 is formed on both one of the first clamping pieces 453 and one of the second clamping pieces 455.

For example, referring to FIG. 7, the second clamping portion 42 is formed in both one of the first clamping pieces 453 and one of the second clamping piece 455.

In this embodiment of this disclosure, the battery cell 905 is clamped using the first clamping piece 453 and the second clamping piece 455, so that the battery cell 905 can be stably clamped in a process of moving along with the carrying apparatus 45. The shared connector 454 is connected to each of the first clamping pieces 453, and all first clamping pieces 453 corresponding to each carrying apparatus 45 are connected into a whole via the shared connector 454. The first driver 452 drives any one of the first clamping pieces 453 to move along the second direction, thereby driving all the first clamping pieces 453 corresponding to the carrying apparatus 45 to move together along the second direction. Because the second clamping piece 455 is connected to the base 451, the second clamping piece 455 does not move relative to the base 451 substantially, and because the first clamping pieces 453 and the second clamping pieces 455 are alternately arranged along the second direction, the first driver 452 drives any one of the first clamping pieces 453 to move, thereby bringing each of the first clamping pieces 453 corresponding to the carrying apparatus 45 and a corresponding second clamping piece 455 closer to or farther apart from each other, so that a battery cell 905 can be clamped between each of the first clamping pieces 453 and the corresponding second clamping piece 455. The first driver 452 drives any one of the first clamping pieces 453 corresponding to the carrying apparatus 45 to move, thereby bringing all the first clamping pieces corresponding to the carrying apparatus 45 together closer to or farther apart from the corresponding second clamping pieces 455, which is convenient for the carrying apparatus 45 to clamp or loosen a plurality of battery cells 905 arranged along the second direction.

Figure 8:
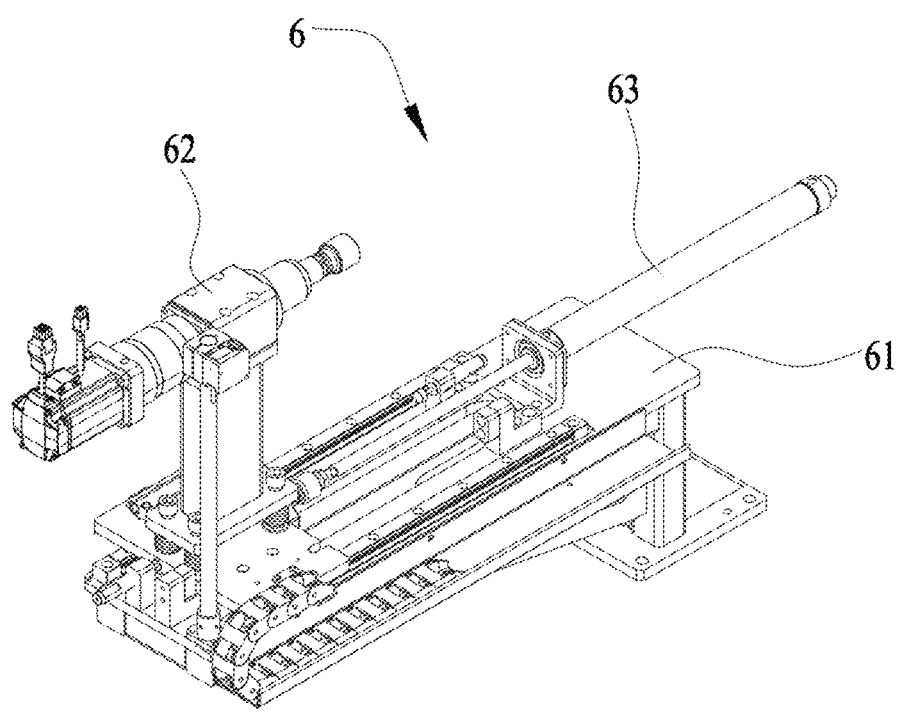
FIG. 8 is a schematic structural diagram of an adjusting assembly according to an embodiment of this disclosure.

In an embodiment, referring to FIG. 8, the adjusting assembly 6 includes a second base 61, an adjustment driving component 62, and a switch driving component 63. The second base 61 is connected to the frame 1. The adjustment driving component 62 is disposed on the second base 61, where when the adjusting assembly 6 is in the first state, the adjustment driving component 62 is disposed on the corresponding carrying assembly 4, and the adjustment driving component 62 drives the corresponding carrying assembly 4 to move, thereby adjusting a distance between the corresponding first clamping portion 41 and the corresponding second clamping portion 42 along the first direction, and when the adjusting assembly 6 is in the second state, the adjustment driving component 62 is disengaged from the carrying assembly 4. The switch driving component 63 is disposed on the second base 61, where the switch driving component 63 is configured to drive the adjustment driving component 62 to move, thereby enabling the adjusting assembly 6 to switch between the first state and the second state.

For example, the switch driving component 63 may be a telescopic air cylinder or a telescopic oil cylinder.

For example, the adjustment driving component 62 may be a rotary motor.

For example, the adjustment driving component 62 may be a combination of a rotary motor and a structure for mounting the rotary motor.

For example, referring to FIG. 4, when the adjusting assembly 6 is in the first state, the adjustment driving component 62 drives the transmission apparatus 44 of the carrying assembly 4 to move.

For example, referring to FIG. 4 and FIG. 5, the transmission apparatus 44 is a screw pair. When the adjusting assembly 6 is in the first state, the adjustment driving component 62 is sleeved on a screw of the screw pair, and the adjustment driving component 62 drives the screw of the screw pair to rotate.

In this embodiment of this disclosure, the switch driving component 63 and the adjustment driving component 62 drive independently so as to implement their respective functions. The switch driving component 63 drives the adjustment driving component 62 to move, thereby enabling the adjustment driving component 62 to be disposed on the corresponding carrying assembly 4 or disengaged from the carrying assembly 4, and the adjusting assembly 6 accordingly switches between the first state and the second state. When the adjusting assembly 6 is in the second state, the adjustment driving component 62 is disengaged from the carrying assembly 4, and the adjustment driving component 62 may stop working. When the adjusting assembly 6 is in the first state, the adjustment driving component 62 is disposed on the corresponding carrying assembly 4, and a driving relationship is established between the adjustment driving component 62 and the carrying assembly 4 located at the transition position 904. The adjustment driving component 62 may drive the carrying assembly 4 located at the transition position 904 to move so as to adjust the distance between the corresponding first clamping portion 41 and the corresponding second clamping portion 42 along the first direction. After the adjustment driving component 62 adjusts the distance between the first clamping portion 41 and the second clamping portion 42 along the first direction, the adjustment driving component 62 may be driven, using the switch driving component 63, to be disengaged from the carrying assembly 4, so that the carrying assembly 4 of which the distance between the first clamping portion 41 and the second clamping portion 42 is adjusted at the transition position 904 is rotated to the loading position 901 driven by the rotary table 3.

Figure 9:
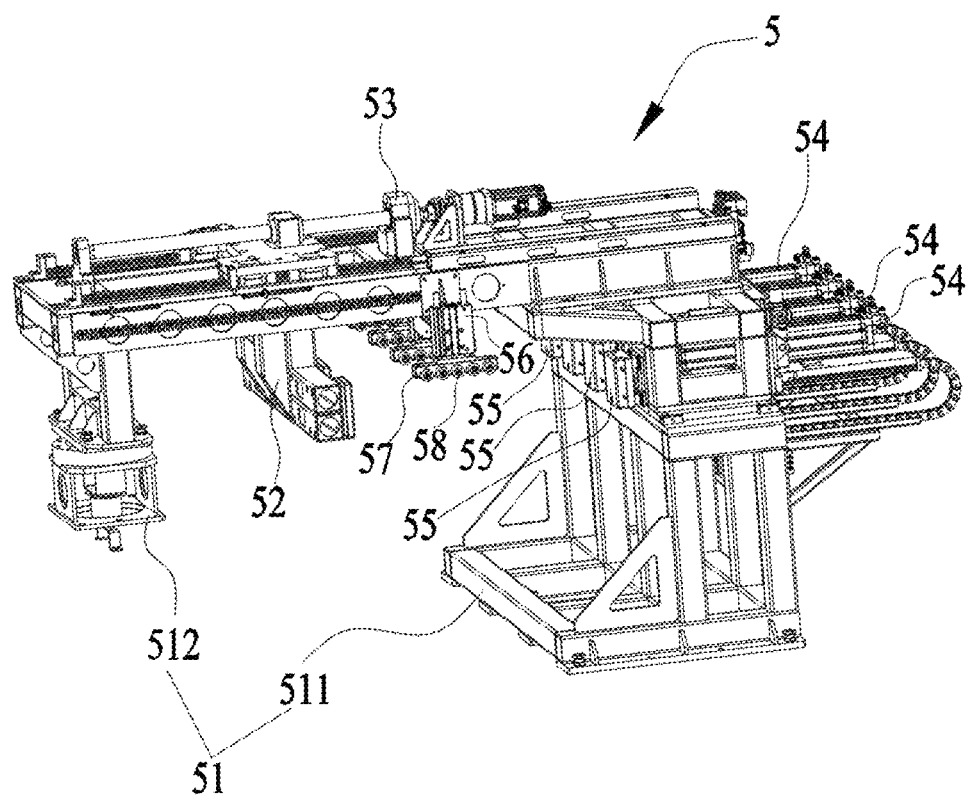
FIG. 9 is a schematic structural diagram of a pressing assembly according to an embodiment of this disclosure.

In an embodiment, referring to FIG. 2, FIG. 3, and FIG. 9, the pressing assembly 5 includes a support apparatus 51, a first pressing apparatus 52, a first driving part 53, a second driving part 54, and a second pressing apparatus 55. The support apparatus 51 is at least partially disposed on the frame 1. The first pressing apparatus 52 is disposed on the support apparatus 51. The first driving part 53 is disposed on the support apparatus 51, where the first driving part 53 is configured to drive the first pressing apparatus 52 to move to a corresponding predetermined position and stay at the predetermined position, thereby enabling the first pressing apparatus 52 to come in contact with grouped battery cells 905 of different sizes. The second driving part 54 is disposed on the support apparatus 51. The second pressing apparatus 55 is at least partially disposed on the second driving part 54, where an arrangement direction of the first pressing apparatus 52 and the second pressing apparatus 55 intersects with a vertical direction, and the second driving part 54 is configured to drive the second pressing apparatus 55 to move toward the first pressing apparatus 52, thereby applying pressure between two grouped battery cells 905.

In this embodiment of this disclosure, referring to FIG. 2 and FIG. 4, the vertical direction is a direction indicated by arrow R3.

The support apparatus 51 is a main part for supporting another structure of the pressing assembly 5.

For example, the first driving part 53 includes a combination of a motor and a mechanism for transmission. The mechanism for transmission may be a screw pair. The motor drives the screw pair to move so as to convert a rotary motion of the motor into a linear motion, so that the first pressing apparatus 52 is driven, using the screw pair, to move along the arrangement direction of the first pressing apparatus 52 and the second pressing apparatus 55. The first pressing apparatus 52 may stay at an adjusted predetermined position using the screw pair.

For example, the second driving part 54 is an air cylinder or an oil cylinder.

For example, referring to FIG. 9, the first pressing apparatus 52 is provided in one, and the one first pressing apparatus 52 comes in contact with a plurality of corresponding battery cells 905. The second pressing apparatuses 55 are provided in plurality, and the second pressing apparatuses 55 are in one-to-one correspondence with the battery cells 905. Each second pressing apparatus 55 is correspondingly provided with the second driving part 54, and the second driving part 54 drives a corresponding second pressing apparatus 55 to move toward the first pressing apparatus 52, so that the second pressing apparatus 55 and the first pressing apparatus 52 jointly apply pressure to the battery cells 905 located between the first pressing apparatus 52 and the second pressing apparatus 55.

For example, the first driving part 53 drives the first pressing apparatus 52 to move to the predetermined position, the first driving part 53 stops driving the first pressing apparatus 52 located at the predetermined position, and the first pressing apparatus 52 stays at the predetermined position by self-locking via a screw thread of the screw.

For example, the first pressing apparatus 52 and the second pressing apparatus 55 apply pressure to two battery cells 905 arranged along a corresponding first direction on the carrying assembly 4 located at the pressing position 902. The two battery cells 905 arranged along the corresponding first direction on the carrying assembly 4 located at the pressing position 902 are located between the first pressing apparatus 52 and the second pressing apparatus 55. One of the two battery cells 905 arranged along the first direction for grouping is clamped using the first clamping portion 41, and the other of the two battery cells 905 arranged along the first direction for grouping is clamped using the second clamping portion 42.

In this embodiment of this disclosure, the first driving part 53 may drive the first pressing apparatus 52 to move to the corresponding predetermined position and stay at the predetermined position. The first pressing apparatus 52 comes in contact with the battery cell 905 at the corresponding predetermined position, the first pressing apparatus 52 is located at the predetermined position, and the first driving part 53 stops driving the first pressing apparatus 52 to move. The first driving part 53 drives the first pressing apparatus 52 to move, thereby enabling the first pressing apparatus to come in contact with the battery cells 905 of different sizes and specifications at the predetermined position and to adapt to pressing the battery cells 905 of different sizes and specifications. The second driving part drives the second pressing apparatus 55 to move toward the first pressing apparatus 52, thereby enabling the battery cell 905 in contact with the first pressing apparatus 52 to be clamped between the first pressing apparatus 52 and the second pressing apparatus 55 and applied with pressure.

In an embodiment, referring to FIG. 3 and FIG. 9, the pressing assembly 5 further includes a second driver 56, a mounting base 57, and a roller 58. The second driver 56 is disposed on the support apparatus 51. The mounting base 57 is disposed on the second driver 56, where the mounting base 57 is located above the carrying assembly 4, and the second driver 56 is configured to drive the mounting base 57 to move along the vertical direction. The roller 58 is rotatably connected to the mounting base 57, where the roller 58 protrudes downward from the mounting base 57, and the roller 58 is located above the carrying assembly 4.

For example, the second driver 56 may be an air cylinder or an oil cylinder.

For example, a pole of the battery cell 905 carried by the carrying assembly 4 faces upward, and the second driver 56 drives the mounting base 57 so as to move the roller 58 to apply pressure to an end of the battery cell 905 facing toward the pole.

For example, the second driver 56 drives the mounting base 57 so as to move the roller 58 to apply pressure to the pole of the battery cell 905.

In this embodiment of this disclosure, because the mounting base 57 is located above the carrying assembly 4, the second driver 56 can drive the mounting base 57 to move downward toward the carrying assembly 4, so as to apply downward pressure to the battery cell 905 carried on the carrying assembly 4. The first pressing apparatus 52 and the second pressing apparatus 55 apply pressure to the grouped battery cells 905 of the corresponding carrying assembly 4 along the first direction of the corresponding carrying assembly 4, and the second driver 56 drives the mounting base 57 so as to move the roller 58 to apply downward pressure to the battery cell 905, so that the grouped battery cells 905 are applied with pressure from two different directions, and therefore the grouped battery cells 905 are firmly bonded by being applied with pressure. In addition, when the second driving part 54 drives the second pressing apparatus 55 to apply pressure to the battery cell 905, the grouped battery cells 905 on the carrying assembly 4 located at the pressing position 902 may slightly move toward the first pressing apparatus 52. Friction on the battery cell 905 can be reduced by the roller 58 coming in contact with an upper end of the battery cell 905, thereby reducing the possibility of battery damage.

In an embodiment, referring to FIG. 1, FIG. 2, and FIG. 4 to FIG. 9, the support apparatus 51 includes a support body 511 and an auxiliary support base 512. The first pressing apparatus 52, the first driving part 53, and the second driving part 54 are all disposed on the support body 511. The auxiliary support base 512 is connected to the rotary table 3, where the support body 511 is rotatably connected to the auxiliary support base 512, and a rotational center line about which the auxiliary support base 512 rotates relative to the support body 511 is coaxial with the rotational center line of the rotary table 3.

In this embodiment of this disclosure, because the first pressing apparatus 52 and the second pressing apparatus 55 apply pressure to the battery cells 905 carried by the carrying assembly 4 located at the pressing position 902 to form groups, the support body 511 supporting the first pressing apparatus 52 and the second driving part 54 driving the second pressing apparatus 55 is partially suspended from the rotary table 3. The auxiliary support base 512 connected to the rotary table 3 is rotatably connected to the support body 511, so that the support body 511 partially suspended from the rotary table 3 may be supported using the auxiliary support base 512 connected to the rotary table 3, which reduces a degree of the support body 511 suspended from the rotary table 3 and is beneficial to increasing rigidity of the support body 511. The rotational center line about which the auxiliary support base 512 that rotates with the rotary table 3 rotates relative to the support body 511 is coaxial with the rotational center line of the rotary table 3, the auxiliary support base 512 that rotates with the rotary table 3 does not drive the support body 511 to rotate, and the support body 511 does not rotate with the auxiliary support base 512. Therefore, the support body 511 can be well supported by the auxiliary support base 512 connected to the rotary table 3 without interfering rotation of the rotary table 3.

In an embodiment, referring to FIG. 5, along the circumferential direction of the rotary table 3, a central angle of every two adjacent carrying assemblies 4 relative to the rotational center line of the rotary table 3 is a predetermined angle α, and the predetermined angles α are equal.

For example, referring to FIG. 5, the carrying assemblies 4 are in a quantity of four, and the predetermined angles α are 90°. When the rotary table 3 rotates by 90°, the carrying assembly 4 originally located at the loading position 901 rotates to the pressing position 902, the carrying assembly 4 originally located at the pressing position 902 rotates to the unloading position 903, the carrying assembly 4 originally located at the unloading position 903 rotates to the transition position 904, and the carrying assembly 4 originally located at the transition position 904 rotates to the loading position 901.

In this embodiment of this disclosure, because the predetermined angles α are equal, every time the rotary table 3 rotates by the predetermined angle α, there is at least one carrying assembly 4 located at the processing positions such as the loading position 901, the unloading position 903, and the pressing position 902, and therefore there is no situation of which one of the processing positions such as the loading position 901, the unloading position 903, and the pressing position 902 may have no carrying assembly 4 due to displacement of the carrying assembly 4 caused by the rotation of the rotary table 3. Even the rotary table 3 rotates by the predetermined angle α, the actions of loading, pressing, and unloading the battery cells 905 can still be executed at the same time, which is beneficial to improve working efficiency.

Figure 10:
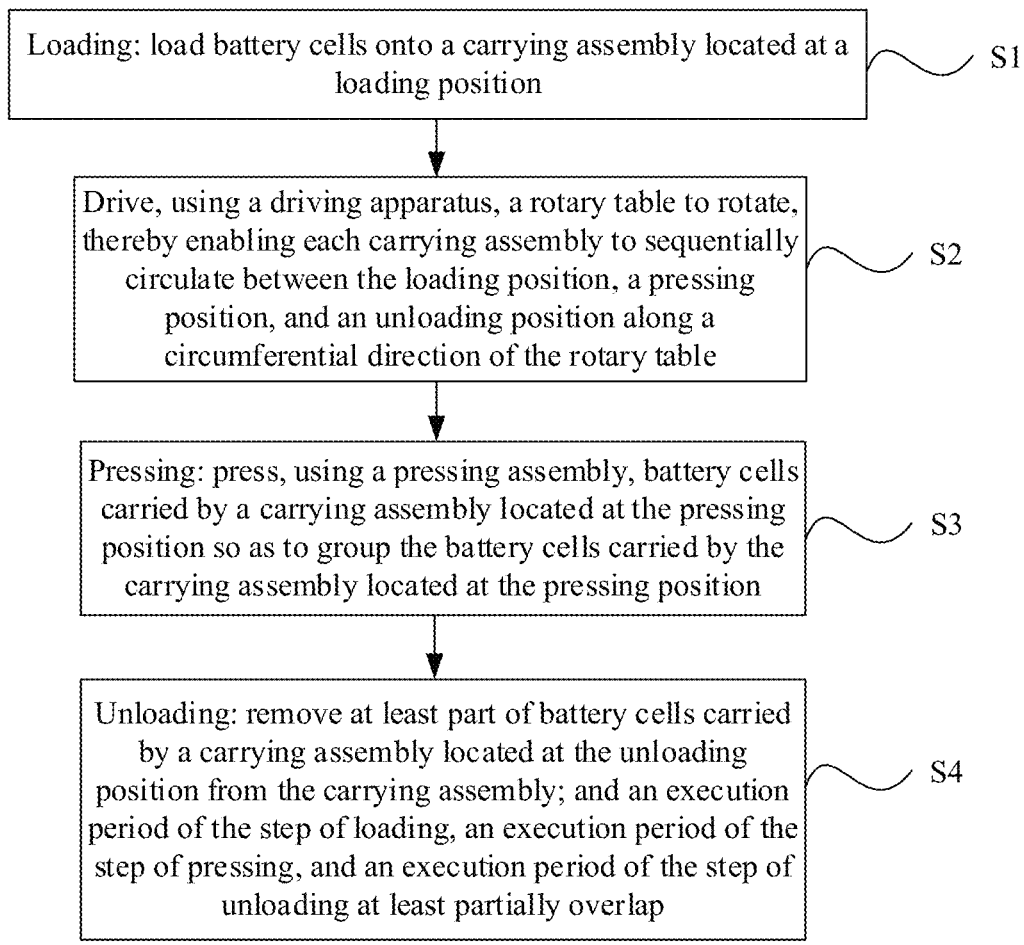
FIG. 10 is a first flow chart of a grouping method according to an embodiment of this disclosure.

An embodiment of this disclosure provides a grouping method, and referring to FIG. 10, the grouping method includes:

Step S1: Loading: load battery cells onto a carrying assembly located at a loading position.

Step S2: Drive, using a driving apparatus, a rotary table to rotate, thereby enabling each carrying assembly to sequentially circulate between the loading position, a pressing position, and an unloading position along a circumferential direction of the rotary table.

Step S3: Pressing: press, using a pressing assembly, battery cells carried by a carrying assembly located at the pressing position so as to group the battery cells carried by the carrying assembly located at the pressing position.

Step S4: Unloading: remove at least part of battery cells carried by a carrying assembly located at the unloading position from the carrying assembly; and an execution period of the step of loading, an execution period of the step of pressing, and an execution period of the step of unloading at least partially overlap.

For example, the execution period of the step of loading, the execution period of the step of pressing, and the execution period of the step of unloading may partially or completely overlap.

For example, removing at least part of the battery cells 905 carried by the carrying assembly 4 located at the unloading position 903 from the carrying assembly 4 may be removing all or part of the battery cells 905 carried by the carrying assembly 4 located at the unloading position 903 from the carrying assembly 4.

In this embodiment of this disclosure, the loading position 901, the pressing position 902, and the unloading position 903 are all correspondingly provided with the carrying assembly 4, and the executions of step S1, step S3, and step S4 have no interference with each other. During the execution of any one of step S1, step S3, and step S4, the other two steps of step S1, step S3, and step S4 may further be executed without waiting. The execution period of the step of loading, the execution period of the step of pressing, and the execution period of the step of unloading at least partially overlap, that is, there is an intersection between the three execution periods. In this overlapping period that has the intersection, the step of loading, the step of pressing, and the step of unloading are executed at the same time, which is beneficial to improve efficiency of grouping the battery cells 905 by the grouping device, thereby improving working efficiency of the grouping device. The rotary table 3 rotates, thereby enabling each carrying assembly 4 to sequentially circulate between the loading position 901, the pressing position 902, and the unloading position 903 along the circumferential direction of the rotary table 3. The carrying assembly 4 that is originally located at the loading position 901 and on which the battery cells 905 are loaded may rotate to the pressing position 902 for pressing to form groups, the carrying assembly 4 that is originally located at the pressing position 902 and that is corresponding to the grouped battery cells 905 formed by pressing may rotate to the unloading position 903 for unloading, the carrying assembly 4 originally located at the unloading position 903 may rotate toward the loading position 901, and the carrying assembly 4 on which unloading is finally finished rotates to the loading position 901 for loading.

Figure 11:
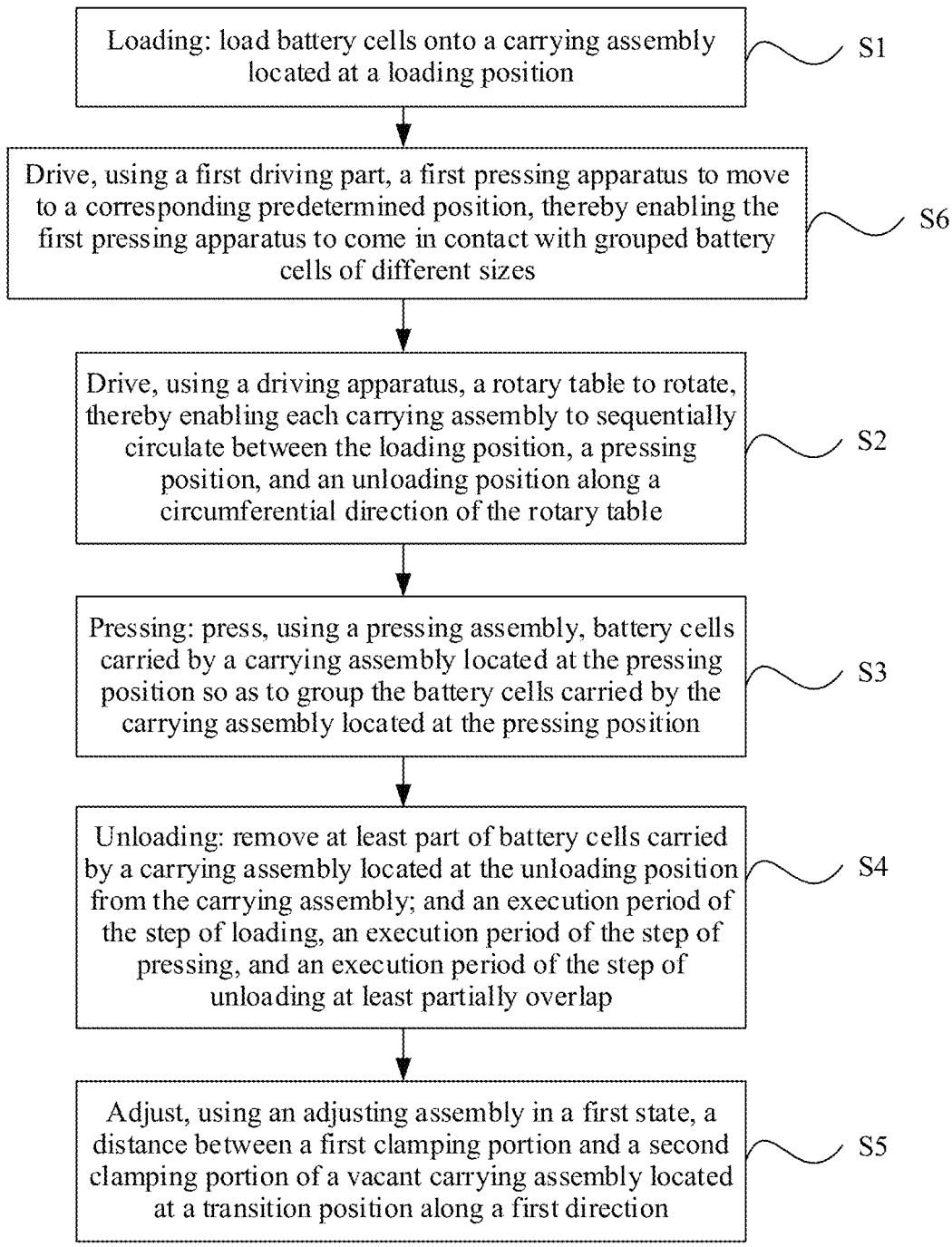
FIG. 11 is a second flow chart of a grouping method according to an embodiment of this disclosure.

In an embodiment, referring to FIG. 11, the grouping method further includes:

Step S5: Adjust, using an adjusting assembly in a first state, a distance between a first clamping portion and a second clamping portion of a vacant carrying assembly located at a transition position along a first direction.

A vacant carrying assembly 4 means that a carrying assembly 4 carries no battery cell 905.

In this embodiment of this disclosure, whether all the battery cells 905 on the carrying assembly 4 are unloaded at the unloading position 903 or all the battery cells 905 on the carrying assembly 4 rotating from the unloading position 903 to the transition position 904 are unloaded, the carrying assembly 4 finally located at the transition position 904 carries no battery cell 905, and the carrying assembly 4 is in a vacant state. The vacant carrying assembly 4 is adjusted using the adjusting assembly 6 so as to change a distance between the first clamping portion 41 and the second clamping portion 42 of the vacant carrying assembly 4 along the first direction. The carrying assembly 4 with the adjusted distance between the first clamping portion 41 and the second clamping portion 42 along the first direction rotates from the transition position 904 to the loading position 901 for loading. The carrying assembly 4 can well carry the battery cells 905 of different sizes through the adjustment of the adjusting assembly 6, and different grouped units are formed by pressing.

In an embodiment, referring to FIG. 11, the grouping method further includes:

Step S6: Drive, using a first driving part, a first pressing apparatus to move to a corresponding predetermined position, thereby enabling the first pressing apparatus to come in contact with grouped battery cells of different sizes.

In this embodiment of this disclosure, the sizes of the battery cells 905 are different, and therefore a predetermined position corresponding to the first pressing apparatus 52 in contact with the battery cell 905 changes accordingly. The first driving part 53 drives the first pressing apparatus 52 to move, which can change a position of the first pressing apparatus 52, so that the first pressing apparatus 52 can move to predetermined positions corresponding to the battery cells 905 of different sizes so as to adapt, using the first pressing apparatus 52 and the second pressing apparatus 55, to pressing the battery cells 905 of different sizes.

Figure 12:
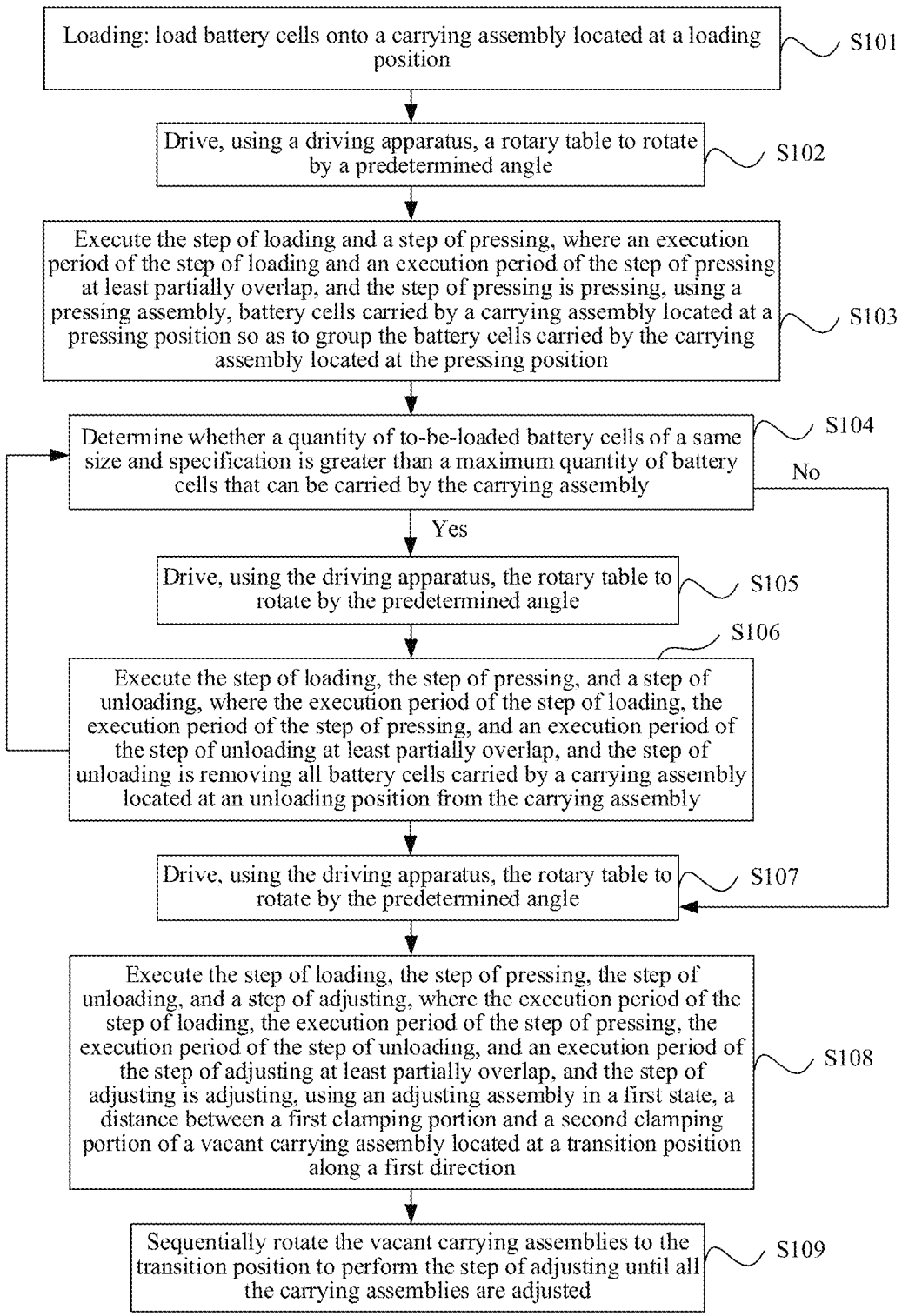
FIG. 12 is a third flow chart of a grouping method according to an embodiment of this disclosure.

Referring to FIG. 12. Specific steps of the grouping method according to an embodiment of this disclosure are as follows.

Step S101: Loading: load battery cells onto a carrying assembly located at a loading position.

Step S102: Drive, using a driving apparatus, a rotary table to rotate by a predetermined angle.

Step S103: Execute the step of loading and a step of pressing, where an execution period of the step of loading and an execution period of the step of pressing at least partially overlap, and the step of pressing is pressing, using a pressing assembly, battery cells carried by a carrying assembly located at a pressing position so as to group the battery cells carried by the carrying assembly located at the pressing position.

Step S104: Determine whether a quantity of to-be-loaded battery cells of a same size and specification is greater than a maximum quantity of battery cells that can be carried by the carrying assembly.

If a quantity of to-be-loaded battery cells of a same size and specification is greater than a maximum quantity of battery cells that can be carried by the carrying assembly, step S105 is performed; and if a quantity of to-be-loaded battery cells of a same size and specification is not greater than a maximum quantity of battery cells that can be carried by the carrying assembly, step S107 is performed.

Step S105: Drive, using the driving apparatus, the rotary table to rotate by the predetermined angle.

Step S106: Execute the step of loading, the step of pressing, and a step of unloading, where the execution period of the step of loading, the execution period of the step of pressing, and an execution period of the step of unloading at least partially overlap, and the step of unloading is removing all battery cells carried by a carrying assembly located at an unloading position from the carrying assembly.

Then, step S104 is performed.

Step S107: Drive, using the driving apparatus, the rotary table to rotate by the predetermined angle.

Step S108: Execute the step of loading, the step of pressing, the step of unloading, and a step of adjusting, where the execution period of the step of loading, the execution period of the step of pressing, the execution period of the step of unloading, and an execution period of the step of adjusting at least partially overlap, and the step of adjusting is adjusting, using an adjusting assembly in a first state, a distance between a first clamping portion and a second clamping portion of a vacant carrying assembly located at a transition position along a first direction.

Step S109: Sequentially rotate the vacant carrying assemblies to the transition position to perform the step of adjusting until all the carrying assemblies are adjusted.

The foregoing embodiments are merely intended for describing the technical solutions of this disclosure, but not for limiting this disclosure. Although this disclosure is described in detail with reference to the foregoing embodiments, persons of ordinary skill in the art should understand that they may still make modifications to the technical solutions described in the foregoing embodiments or make equivalent replacements to some or all technical features thereof. All such modifications or replacements do not make the essence of the corresponding technical solutions depart from the scope of the technical solutions of the embodiments of this disclosure and shall fall within the scope of this disclosure. In particular, as long as there is no structural conflict, the various technical features mentioned in the embodiments can be combined in any manners.

INDUSTRIAL PRACTICABILITY

According to the embodiments of this disclosure, the driving apparatus drives the rotary table so as to move the carrying assembly and the battery cells carried by the carrying assembly to rotate together. At least three carrying assemblies are spaced apart along the circumferential direction of the rotary table. Even if different actions are executed on three carrying assemblies at different positions, mechanisms that execute different actions on battery cells on the three carrying assemblies at different positions have no interference with each other and may perform executions at the same time. Therefore, the three steps of loading the battery cells onto the carrying assembly located at the loading position, pressing, using the pressing assembly, the battery cells carried by the carrying assembly located at the pressing position to form groups, and removing the battery cells from the carrying assembly located at the unloading position may be performed at the same time without waiting. A carrying assembly corresponding to the battery cells that are loaded at the loading position rotates to the pressing position using the rotary table, a carrying assembly corresponding to the battery cells that are pressed to form groups at the pressing position rotates to the unloading position using the rotary table, and a carrying assembly corresponding to the battery cells that are removed at the unloading position rotates to the loading position using the rotary table, so that a finally vacant carrying assembly can return to the loading position for loading, and the three actions of loading, pressing to form groups, and unloading are executed at the same time without interference, thereby improving efficiency of grouping the battery cells by the grouping device, that is, improving working efficiency of the grouping device. In addition, the carrying assembly circulates between the loading position, the pressing position, and the unloading position. A corresponding pressing assembly is disposed only at the pressing position, and a pressing assembly does not need to be disposed at another position such as the loading position and the unloading position, thereby reducing costs.

What is claimed is:

1. A grouping device, comprising:
   a frame provided with a loading position, an unloading position, and a pressing position;
   a driving apparatus, disposed on the frame;
   a rotary table, at least partially disposed on the driving apparatus, so that the driving apparatus drives the rotary table to rotate;
   carrying assemblies, disposed on the rotary table so as to rotate with the rotary table, where the carrying assemblies are in a quantity of at least three, the at least three carrying assemblies are spaced apart along a circumferential direction of the rotary table, the carrying assemblies are configured to carry battery cells, at least one of the carrying assemblies is located at the loading position, at least one of the carrying assemblies is located at the unloading position, and at least one of the carrying assemblies is located at the pressing position, the loading position is located on a side of the pressing position facing away from a rotation direction of the rotary table, and the unloading position is located on a side of the pressing position facing toward the rotation direction of the rotary table; and
   a pressing assembly, disposed on the frame, where the pressing assembly is configured to press battery cells carried by the carrying assembly located at the pressing position so as to group a plurality of corresponding battery cells.

2. The grouping device according to claim 1, wherein the carrying assemblies are in a quantity of at least four, at least one of the carrying assemblies is located at a transition position, the transition position is located on a side of the unloading position facing toward the rotation direction of the rotary table, and the transition position is located on a side of the loading position facing away from the rotation direction of the rotary table.

3. The grouping device according to claim 2, wherein the carrying assembly has a plurality of clamping portions, at least one of the clamping portions is a first clamping portion configured to clamp one of grouped battery cells, at least one of the clamping portions is a second clamping portion configured to clamp another battery cell of the grouped battery cells, an arrangement direction of the first clamping portion and the second clamping portion is a first direction; the grouping device further comprises an adjusting assembly disposed on the frame, the adjusting assembly, when in a first state, is configured to adjust a distance between the first clamping portion and the second clamping portion of the carrying assembly located at the transition position along the first direction, and the adjusting assembly, when in a second state, is disengaged from the carrying assembly.

4. The grouping device according to claim 3, wherein the carrying assembly comprises:
   a first base, connected to the rotary table, wherein an arrangement direction of a side of the first base facing toward a rotational center line of the rotary table and a side of the first base facing away from the rotational center line of the rotary table is defined as an inward-outward direction;
   a transmission apparatus, disposed on the first base; and
   carrying apparatuses, disposed on the transmission apparatus, where the carrying apparatuses are provided in plurality, the plurality of carrying apparatuses are arranged along the inward-outward direction, the clamping portions are formed on the carrying apparatuses, with the first clamping portion formed on one of the carrying apparatuses and the second clamping portion formed on another carrying apparatus, and the adjusting assembly is configured to drive the transmission apparatus so as to move the corresponding carrying apparatus, thereby bringing the first clamping portion and the second clamping portion closer to or farther apart from each other along the first direction.

5. The grouping device according to claim 4, wherein the carrying apparatus comprises:
   a base, disposed on the transmission apparatus;
   a first driver, disposed on the base;
   first clamping pieces, disposed on the base, where the first clamping pieces are provided in plurality, the plurality of first clamping pieces are spaced apart along a second direction, the second direction intersects with the first direction, the first driver drives the first clamping piece to move along the second direction, and the clamping portion is formed on the first clamping piece;
   a shared connector, connected to each of the first clamping pieces; and
   second clamping pieces, connected to the base, where the second clamping pieces and the first clamping pieces are alternately arranged along the second direction, and the clamping portion is formed on the second clamping piece.

6. The grouping device according to claim 3, wherein the adjusting assembly comprises:
   a second base, connected to the frame;
   an adjustment driving component, disposed on the second base, wherein when the adjusting assembly is in the first state, the adjustment driving component is disposed on the corresponding carrying assembly, and the adjustment driving component drives the corresponding carrying assembly to move, thereby adjusting a distance between the corresponding first clamping portion and the corresponding second clamping portion along the first direction, and when the adjusting assembly is in the second state, the adjustment driving component is disengaged from the carrying assembly; and a switch driving component, disposed on the second base, where the switch driving component is configured to drive the adjustment driving component to move, thereby enabling the adjusting assembly to switch between the first state and the second state.

7. The grouping device according to claim 1, wherein the pressing assembly comprises:
   a support apparatus, at least partially disposed on the frame;
   a first pressing apparatus, disposed on the support apparatus;
   a first driving part, disposed on the support apparatus, where the first driving part is configured to drive the first pressing apparatus to move to a corresponding predetermined position and stay at the predetermined position, thereby enabling the first pressing apparatus to come in contact with grouped battery cells of different sizes;
   a second driving part, disposed on the support apparatus; and
   a second pressing apparatus, at least partially disposed on the second driving part, where an arrangement direction of the first pressing apparatus and the second pressing apparatus intersects with a vertical direction, and the second driving part is configured to drive the second pressing apparatus to move toward the first pressing apparatus, thereby applying pressure between two grouped battery cells.

8. The grouping device according to claim 7, wherein the pressing assembly further comprises:
   a second driver, disposed on the support apparatus;
   a mounting base, disposed on the second driver, where the mounting base is located above the carrying assembly, and the second driver is configured to drive the mounting base to move along the vertical direction; and
   a roller, rotatably connected to the mounting base, where the roller protrudes downward from the mounting base, and the roller is located above the carrying assembly.

9. The grouping device according to claim 7, wherein the support apparatus comprises:
   a support body, wherein the first pressing apparatus, the first driving part, and the second driving part are all disposed on the support body; and
   an auxiliary support base, connected to the rotary table, wherein the support body is rotatably connected to the auxiliary support base, and a rotational center line about which the auxiliary support base rotates relative to the support body is coaxial with the rotational center line of the rotary table.

10. The grouping device according to claim 1, wherein along the circumferential direction of the rotary table, a central angle of every two adjacent carrying assemblies relative to the rotational center line of the rotary table is a predetermined angle, and the predetermined angles are equal.

11. A battery production line, comprising:
    the grouping device according to claim 1;
    a loading device, configured to transfer battery cells onto a carrying assembly located at the loading position; and
    an unloading device, configured to remove battery cells from a carrying assembly located at the unloading position.

12. A grouping method, comprising:
    loading: loading battery cells onto a carrying assembly located at a loading position;
    driving, using a driving apparatus, a rotary table to rotate, thereby enabling each carrying assembly to sequentially circulate between the loading position, a pressing position, and an unloading position along a circumferential direction of the rotary table;
    pressing: pressing, using a pressing assembly, battery cells carried by a carrying assembly located at the pressing position so as to group the battery cells carried by the carrying assembly located at the pressing position; and
    unloading: removing at least part of battery cells carried by a carrying assembly located at the unloading position from the carrying assembly;
    wherein an execution period of the step of loading, an execution period of the step of pressing, and an execution period of the step of unloading at least partially overlap.

13. The grouping method according to claim 12, further comprising:
    adjusting, using an adjusting assembly in a first state, a distance between a first clamping portion and a second clamping portion of a vacant carrying assembly located at a transition position along a first direction.

14. The grouping method according to claim 12, further comprising:
    driving, using a first driving part, a first pressing apparatus to move to a corresponding predetermined position, thereby enabling the first pressing apparatus to come in contact with grouped battery cells of different sizes.

* * * * *